Aug. 27, 1935.  P. HANSEN  2,012,927
METHOD AND APPARATUS FOR MOLDING RUBBER GOODS WITH RELIEF DESIGNS
Filed Dec. 7, 1931
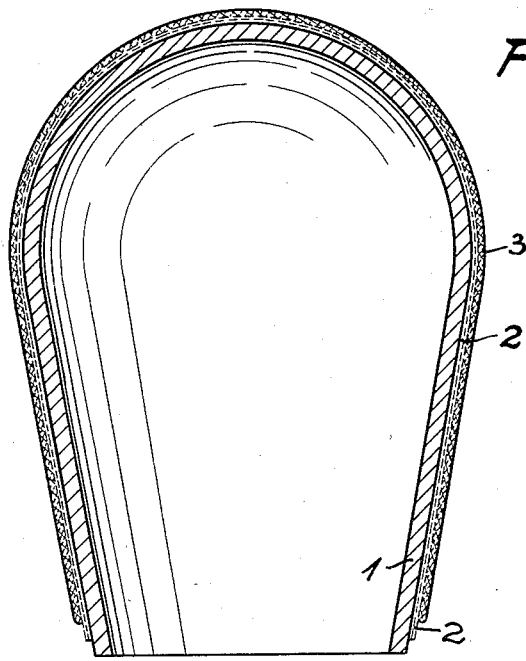
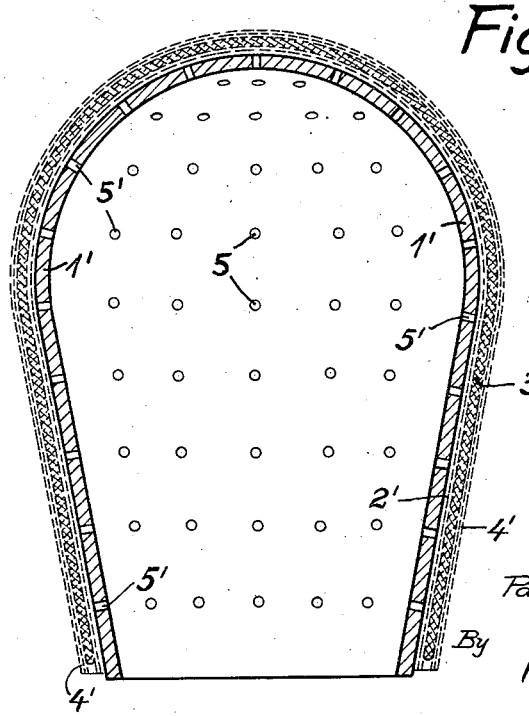
Inventor:
Paul Hansen
By
Attorney Patented Aug. 27, 1935

2,012,927

UNITED STATES PATENT OFFICE 2,012,927

METHOD AND APPARATUS FOR MOLDING RUBBER GOODS WITH RELIEF DESIGNS

Paul Hansen, Hamburg, Germany, assignor, by mesne assignments, to I. B. Kleinert Rubber Company, New York, N. Y.

Application December 7, 1931, Serial No. 579,560
In Germany November 16, 1931

14 Claims. (Cl. 18—35)

The invention concerns a process and an arrangement for the production of patterned rubber goods.

It is known to provide rubber goods, such, for example, as bathing caps, bathing shoes and the like with relief patterns by vulcanizing rubber mixture rolled out into sheets, and, if desired, coloured, in iron pressure molds under pressure. The inner surface of the pressure mold, which, if desired, can contain a core, is, when the rubber goods are to be provided with pressed patterns, engraved, or provided in other manner with a matrix with the desired pattern in relief. During the vulcanization under pressure the pattern is impressed upon the rubber sheet.

These known processes have various disadvantages. The necessary pressure molds are very costly and the utilization is poor, since for each object a particular form must be employed during the whole of the vulcanization period. Particularly also for each pattern a special mold must be available, and as a result of the cost of the molds and the dependence upon the availability of matrices, the choice of various patterns has thus hitherto been considerably limited.

A further disadvantage is that in these pressure molds there may be worked only very definite rubber mixes which contain no constituents giving rise to gas evolution, since a gas evolution in the pressure mold during vulcanization forms blisters and gives failures in the products. Moreover, in the process only patterns with smooth or shiny outer surfaces can be obtained so that there are limits in this direction also.

According to the invention a process for the production of ornamented rubber goods is so constituted that it is distinguished by the fact that rubber layers, preferably after pretreatment, i. e., after treatment necessary prior to vulcanization, are drawn on to a suitable core constructed, preferably, of heat-conducting or heat-permeable material and the desired pattern being produced upon the inner or the outer surface of the rubber mass by an interchangeable jacket or cover of a suitable material; as such a cover, e. g. a web or textile material, paper, woven metal or other fibrous material may be used.

In addition to coating the outside of the core a second web can be placed on the outside of the rubber mass.

The invention is illustrated by way of example in the drawing.

In Fig. 1 a section through a hollow core according to the invention is shown with the textile web or the like lying thereover.

Fig. 2 shows a second embodiment of the invention, in which the rubber layer is to be provided both inside and outside with patterns.

As will be observed from the drawing, the process according to the invention is so carried out that a core 1, constructed of heat conducting or heat permeable material, for example, from iron, aluminium or the like, with closed walls or with walls provided with openings, is covered with a jacket 2. The jacket or cover 2 consists of a textile web, for example a jute web or the like, a paper web, a woven metal material or the like.

The vulcanization core so prepared is then covered with the object to be patterned, made from a sheet of raw rubber mixture 3, for example, for a bathing cap, as is shown in the drawing. The bathing cap 2 lies closely and tightly to the core or to the web and is brought into the vulcanization apparatus together with the core and vulcanized. In this manner the web 2 is pressed into the rubber material 3 so that the vulcanized object shows relief patterns on the inside corresponding to the outer surface of the webs employed. If the bathing cap is then turned inside out the pattern is on the outside.

If the object is to be provided with patterns on both sides according to the invention then the procedure is advantageously that shown in Fig. 2.

Over the core 1' which may be porous or provided with orifices 5', a textile web 2' or the like is applied, and thereover is applied the prepared object 3' made of unvulcanized rubber mix. Over the rubber material 3', a second jacket 4' of web or the like is placed and the whole is cured in hot air, steam, water or another suitable medium, and if desired, it may be subjected to pressure.

If various kinds of textile web of, for example, different pattern or varying lace pattern are employed for the inside and the outside textile coatings 2', 4', then rubber goods are obtained which show different patterns inside and outside. The process according to the invention allows the production of patterned objects of matt surface and it allows the production of a multitude of artificially formed relief designs as desired. Since the described core and the webs employed for the imprinting of the relief patterns are very cheap and easy to procure, the invention can be employed with few means to obtain a great number of novel and very varied relief patterns on rubber goods. By the replacement of the expensive pressure molding a great saving of time and power results and an essentially superior process results.

Since the jacket or the web is porous or permeable, according to the invention also, such rubber mixes are worked which contain gas-developing materials and which are not suitable for vulcanization in closed pressure molds. Thus, for example, according to the invention, mixtures comprising factis may be employed with excellent results. The hydrochloric acid gas or the like developed from the factis can escape through the permeable textile underlayer of the device according to the invention, whereas such mixtures cannot be used for the production of relief patterns employing closed pressure molds on account of the formation of blisters and the production of useless products.

As a further advantage of the invention practically no scraps are obtained. In using pressure molds to produce relief patterns on rubber goods, the rubber mixture softens at the vulcanization temperature and grows and flows into the holes of the mold. As the quantity of the rubber mixture may not be measured quite exactly the abundant rubber mixture overflows the mold and according to the hitherto known methods relatively large quantities of vulcanized rubber scraps are obtained. According to this invention practically no scraps are obtained and therefore the new process is more economical than the processes hitherto known.

A further progress of the new process is, that also the production of rubber goods with several colours is possible, e. g. of coloured designs as the colours do not flow together as in the known processes, because the rubber mass weakened in the pressing molds and the separate colours flowed together. Besides this, the products, according to this invention, at any time of the process before, during or after the curing, may be observed, something not possible when using closed pressure molds; therefore, the production of useless products is excluded as far as possible.

The invention is not limited to the described embodiments or the embodiments shown in the drawing, and all processes and devices serving the same purposes, in which relief patterns on rubber goods are supplied by interchangeable objects such as films, webs, sheet layers of band or fibrous materials of textile character, paper, metal, artificial materials and the like are included within the scope of the invention.

I claim:—

1. The method of molding relief patterned goods, which consists in removably enclosing a substantially dome-shaped rigid core in a flexible jacket corresponding substantially to the shape of the core and having the desired pattern on its external face, applying a vulcanizable object over the jacket in close engagement with the patterned face thereof, enclosing said object in a second flexible pattern-carrying sheet with the pattern against the outer face of the object, and vulcanizing the object while interposed between and in contact with the patterns of said sheets.

2. The method of molding relief patterned goods, which consists in removably mounting a flexible jacket upon a substantially dome-shaped rigid core, said jacket corresponding substantially to the shape of the core and having the desired pattern on its external face, applying a vulcanizable object over the jacket in close engagement with the patterned face thereof, applying to the outer face of said object a second flexible pattern-carrying sheet with the pattern against the said outer face, and vulcanizing the object while interposed between and in contact with the patterns of said sheets, and causing said sheets and object in themselves to create sufficient cooperative pressure to maintain their active relation during vulcanization.

3. A pattern structure for vulcanizable objects comprising a substantially rigid dome-shaped hollow core having a closed end and of heat transmitting material, and a flexible pattern carrying member corresponding to the contour of the base and detachably fitting over and enclosing the same, said member having an exposed face provided with the pattern to be created on the vulcanizable object.

4. In a process of producing relief designs in molded flexible, thin-walled, pouch-defining rubber objects, wherein the body of the object is preliminarily defined from sheet rubber, not yet vulcanized, and a form is provided upon which the formed object is removably positioned, the steps of mounting the body of an object so defined upon the form so that the form is housed within the pouch and causing the objects closely to follow and conform to the shaping of the form, applying directly to the object upon the form a flexible device capable of shaping itself to the contour of the object on the form, and then subjecting the object to a curing medium.

5. In a process of producing relief designs in molded flexible, thin-walled, pouch-defining rubber objects, wherein the body of the object is preliminarily defined from sheet rubber, not yet vulcanized, and a form is provided upon which the formed object is removably positioned, the steps of mounting the body of a formed object upon the form so that the form is housed within the pouch and causing the object closely to follow and conform to the shaping of the form, encasing the object and the form within a flexible device capable of shaping itself to the contour of the object on the form, and then subjecting the object to a curing medium.

6. In a process of producing relief designs in molded flexible, thin-walled, pouch-defining rubber objects, wherein the body of the object is preliminarily defined from sheet rubber, not yet vulcanized, and a form is provided upon which the formed object is removably positioned, the steps of mounting the body of a formed object upon the form so that the form is housed within the pouch and causing the object closely to follow and conform to the shaping of the form, encasing the object and the form within a flexible device, causing the device closely to adhere to the object on the form, and then subjecting the object to a curing medium.

7. In a process of producing relief designs in molded flexible, thin-walled, pouch-defining rubber objects, wherein the body of the object is preliminarily defined from sheet rubber, not yet vulcanized, and a form is provided upon which the formed object is removably positioned, the steps of mounting the body of a formed object upon the form so that the form is housed within the pouch and causing the object closely to follow and conform to the shaping of the form, encasing the object and the form within a flexible device, causing the device closely to adhere to the object on the form, and then vulcanizing the object while it continues retained upon the form.

8. A method for simultaneously vulcanizing and producing design configuration upon the surface of flexible pouch-defining rubber objects such as rubber bathing caps, which includes the steps of preparing from rubber sheet, the vulcanization of which has not been completed, a pouch-defining member, positioning the member upon a formed support to impart to the member a predetermined final shaping and so that the member closely hugs the support, applying over the member a flexible element capable of assuming the shaping of the assembled member and support, causing the element closely to adhere to the member so that the irregularities in the surface of the element engaging against the member will be imparted to the member to produce a design configuration on the surface of the member, and subjecting the assembled support, member and element to a vulcanizing medium.

9. A method for simultaneously vulcanizing and producing design configuration upon the surface of flexible pouch-defining rubber objects such as rubber bathing caps, which includes the steps of sealing together a plurality of sections of rubber sheet the vulcanization of which has not been completed so that, when the sealed sections are opened away from each other a pouch-defining member will be constituted, positioning the opened-out member upon a formed support to impart to the member a predetermined final shaping and so that the member closely hugs the support, applying over the member a flexible element capable of assuming the shaping of the assembled member and support, causing the element closely to adhere to the member so that the irregularities in the surface of the element engaging against the member will be imparted to the member to produce a design configuration on the surface of the member, and subjecting the assembled support, member and element to a vulcanizing medium.

10. A method for simultaneously vulcanizing and producing design configuration upon the surface of flexible, pouch-defining rubber objects such as rubber bathing caps, which includes the steps of preparing from rubber sheet, the vulcanization of which has not been completed, a pouch-defining member, positioning upon a formed support a flexible element so that the element closely adheres to the support, positioning the opened-out member upon the support to impart to the member a predetermined final shaping and so that the member closely hugs the element upon the support, applying over the member another flexible element capable of assuming the shaping of the assembled element, member and support, causing the last-mentioned element closely to adhere to the member so that the irregularities in the surface of the element engaging against the member will be imparted to the member to produce a design configuration on the surface of the member, and subjecting the assembled support, member and element to a vulcanizing medium.

11. A method for simultaneously vulcanizing and producing design configuration upon the surfaces of flexible, pouch-defining rubber objects such as rubber bathing caps, which includes the steps of preparing from rubber sheet, the vulcanization of which has not been completed, a pouch-defining member, positioning upon a formed support a flexible element so that the element closely adheres to the support, positioning the opened-out member upon the support to impart to the member a predetermined final shaping and so that the member closely hugs the element upon the support, applying over the member another flexible element capable of assuming the shaping of the assembled element, member and support, causing the last-mentioned element closely to adhere to the member so that the irregularities in the surfaces of the elements engaging against the member will be imparted to the member to produce a design configuration on the surfaces of the member, and subjecting the assembled support, member and elements to a vulcanizing medium.

12. Apparatus for molding and vulcanizing rubber, pouch-forming articles such as rubber bathing caps, shoes and the like, including a form for insertion into the pouch of the unvulcanized article, the form having substantially the contouring of that element upon which the article finally is intended to be seated, and a flexible member for reception over the form and the article thereon positioned, the member being constructed to be capable of being drawn closely against the article when positioned on the form.

13. Apparatus for molding and vulcanizing rubber, pouch-forming articles such as rubber bathing caps, shoes and the like, including a form for insertion into the pouch of the unvulcanized article, the form having substantially the contouring of that element upon which the article finally is intended to be seated, and a flexible textile member for reception over the form and the article thereon positioned, the member being constructed to be capable of being drawn closely against the article when positioned on the form.

14 Apparatus for molding and vulcanizing rubber, pouch-forming articles such as rubber bathing caps, shoes and the like, including a form for insertion into the pouch of the unvulcanized article, the form having substantially the contouring of that element upon which the article finally is intended to be seated, and a flexible textile member for reception over the form and the article thereon positioned, the member being constructed to be capable of being drawn closely against the article when positioned on the form, the surface of the member, by the manner of its construction, being of an irregularity to define a predetermined configuration.

PAUL HANSEN.